May 21, 1957  M. L. BREHMER  2,793,076
DIESEL FUEL INJECTOR CONVERSION
Filed Feb. 18, 1954  2 Sheets-Sheet 1

INVENTOR.
Melvin L. Brehmer
BY
Attorney.

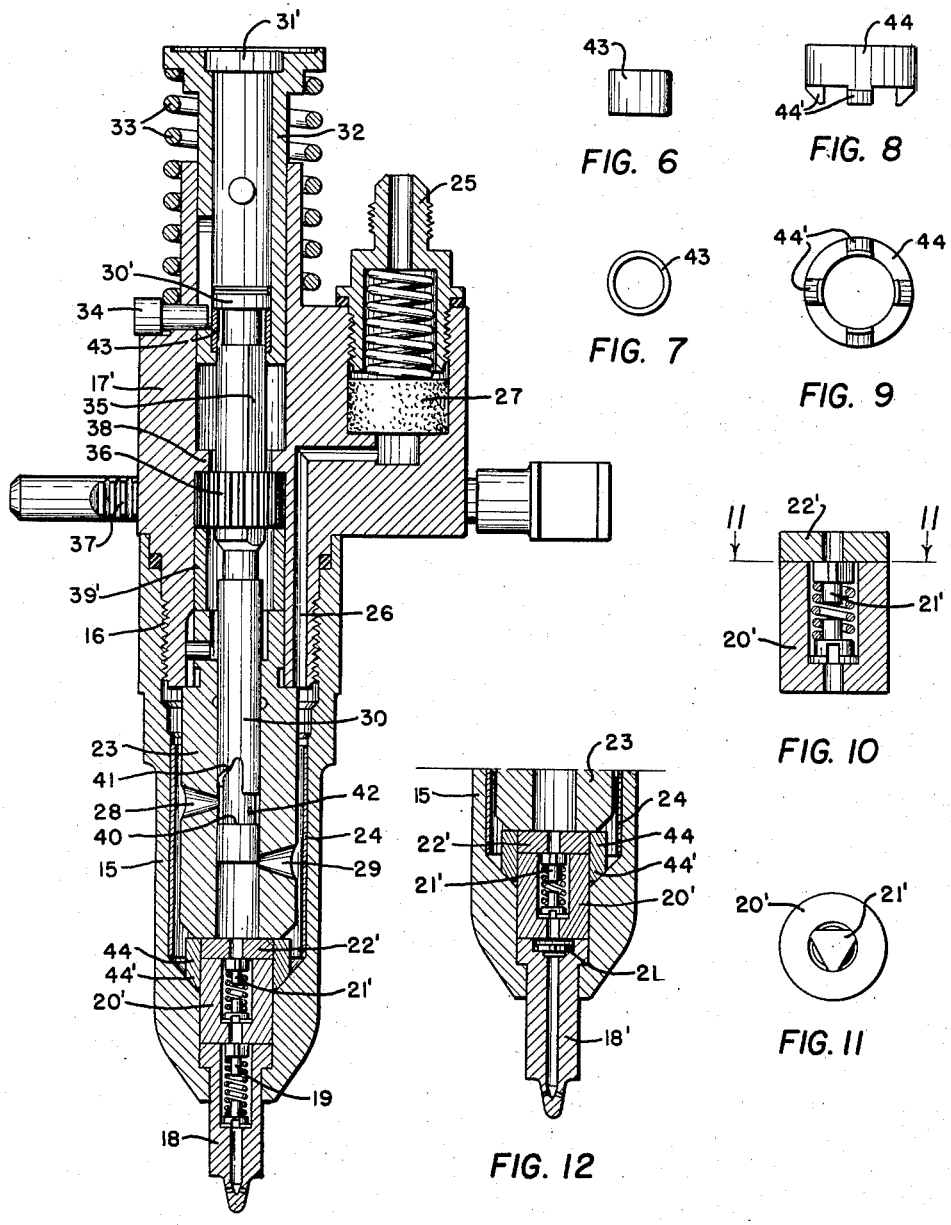

United States Patent Office 2,793,076
Patented May 21, 1957

2,793,076

DIESEL FUEL INJECTOR CONVERSION

Melvin L. Brehmer, Denver, Colo.

Application February 18, 1954, Serial No. 411,156

2 Claims. (Cl. 299—107.2)

This invention relates to injectors such as are commonly employed for the metered supply of atomized liquid hydrocarbon fuel directly to the cylinder combustion chambers of diesel-type internal combustion engines, and has as an object to provide a novel organization and operative correlation of elements constituting an improved such injector of enhanced operative advantage.

A further object of the invention is to provide a novel technique for the conversion of conventional diesel fuel injectors to improved operative form with economy of material and effort.

A further object of the invention is to provide a novel technique economically applicable to enhance the reliable performance and to prolong the utility of conventional diesel fuel injectors.

A further object of the invention is to provide a novel process applicable through ordinary and available means to convert conventional diesel fuel injectors to an operatively improved form eliminative of inadequacies inherent in the conventional unit.

A further object of the invention is to provide a novel and expedient process for operatively associating an improved dual valve assembly in and to function with a conventional diesel fuel injector organization.

A further object of the invention is to provide a novel and practical diesel fuel injector conversion that obviates much occasion for expensive injector replacements, that utilizes and conserves the major organization of conventional injectors to which it is applied, that is susceptible of accomplishment by mechanics without recourse to specialized equipment, and that is positive and efficient in the attainment of the ends for which designed.

With the foregoing and other objects in view, my invention consists in the structural modifications, correlations and reorganizations, and in the techniques appurtenant thereto, as hereinafter set forth, pointed out in my claims, and illustrated by the accompanying drawings, in which—

Figure 5 is a section similar to Figure 1 taken axially through an assembled injector unit conversion incorporating and exemplifying the principles and techniques of the invention.

Figure 6 is a side elevation of an adapter element added to effect the conversion shown in Figure 5.

Figure 7 is an end view of the adapter element shown in Figure 6.

Figure 8 is a side elevation of a second adapter element added to effect the conversion shown in Figure 5.

Figure 9 is an end view of the adapter element shown in Figure 8.

Figure 10 is a section, on a relatively enlarged scale, axially through a valve assembly added to effect the conversion shown in Figure 5.

Figure 11 is an end view of the lower component of the assembly shown in Figure 10 and as viewed from the indicated zone 11—11 of said latter view.

Figure 12 is a fragmentary, detail section corresponding to the lower end of Figure 5 and illustrating an alternative valve arrangement within the contemplation of the invention.

Figures 1, 2, 3, 4:
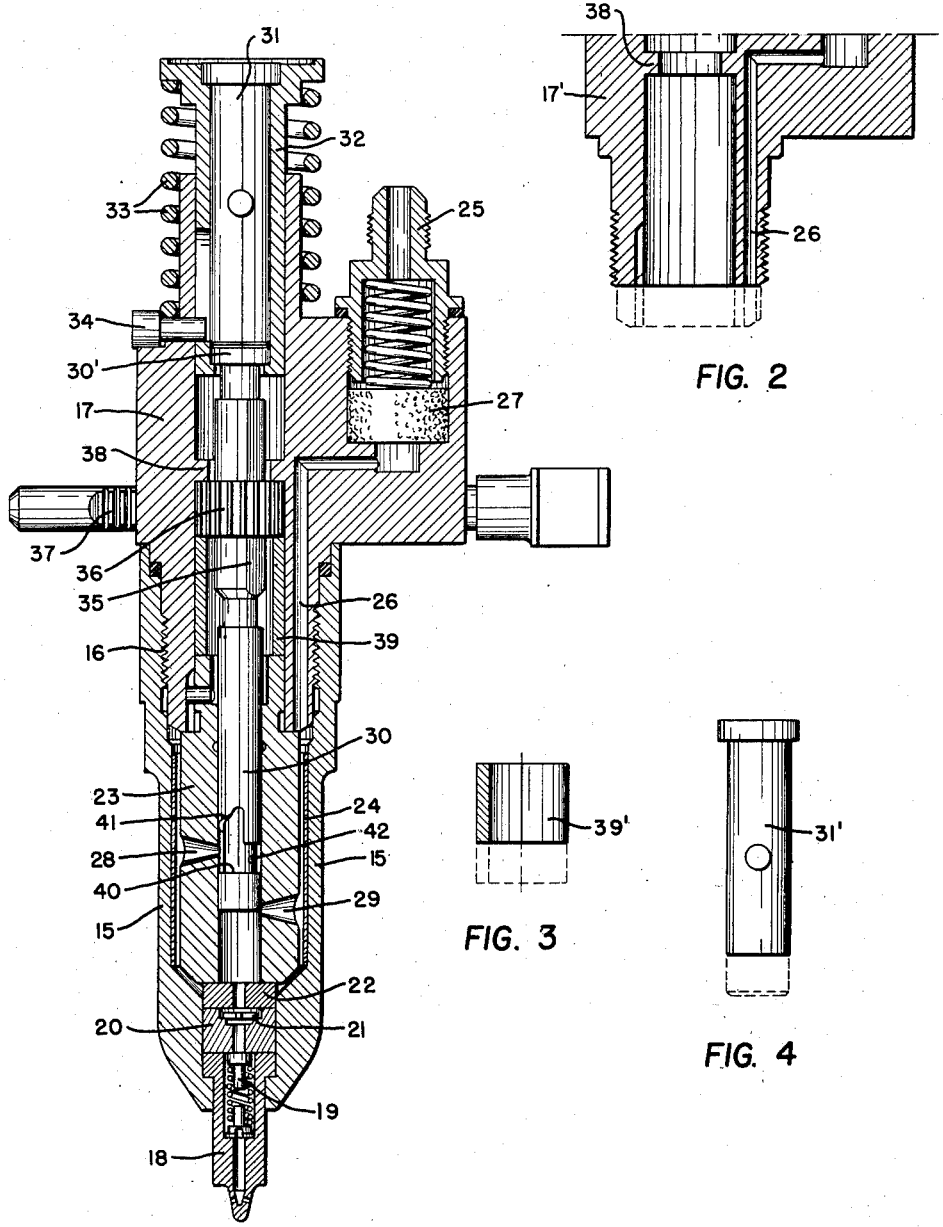
Figure 1 is a longitudinal section taken substantially axially through a conventional diesel fuel injector of a type and construction to which the improvements of the instant invention are particularly applicable.
Figure 2 is a fragmentary, detail section axially through a portion of a member isolated from the organization according to Figure 1 and as modified in accordance with the invention, broken lines indicating the conventional form of the member prior to its modification.
Figure 3 is a half-sectional elevation of another element isolated from the organization according to Figure 1 and as modified in accordance with the invention, broken lines indicating the conventional form of the element prior to its modification.
Figure 4 is an elevation of yet another element isolated from the organization according to Figure 1 and as modified in accordance with the invention, broken lines indicating the conventional form of the element prior to its modification.

The injector represented by Figure 1 is of a type and construction extensively in use with less than adequate satisfaction for reasons that will hereinafter appear, the illustration of the conventional unit and the following brief description thereof being requisite for competent understanding and explanation of the invention applicable to its improvement.

A generally-tubular, nosed housing 15 is internally threaded as a nut 16 adjacent its end remote from the nose for cooperation with a complementary tubular extension of a block-like body 17 thereby detachably coupled to and as an extension of the housing 15. A shouldered spray tip 18 is seated coaxially through and projects beyond the nose of the housing 15 and houses a spring-loaded check valve 19 arranged to close against the adjacent side of a double check valve seat 20 which carries a flat valve 21 inwardly of the nose from the valve 19 and arranged to close against a seat on the adjacent side of a superposed block 22; the said valves 19 and 21 controlling a flow passage axially through the tip 18, seat 20, and block 22 in a manner to doubly close the passage in reaction to pressure entering the free end of the tip 18 and to open the passage in reaction to adequate pressures incident upon and through the block 22.

Centered and held against rotation at its upper end within the end of the body 17 extension coupled to the housing 15, a tubular bushing 23 rests at its lower end against the block 22 in a slight spacing away from the adjacent inner end of the housing nose and in a spacing of its cylindrical exterior wall inwardly from the adjacent inner walls of the housing, and a deflector sleeve 24 spacedly surrounds said bushing interiorly of the housing. A nipple 25 connectible with a fuel input line outstands from the body 17 at the outer end of a fuel flow passage 26 which leads through a filter 27 and the block 17 to deliver to the space between the bushing and housing 15 at the upper end of said bushing, and upper and lower ports, 28 and 29, respectively, radially intersect the bushing 23 and are spaced apart both angularly and axially of said bushing for inflow of liquid fuel from the space exteriorly about said bushing to the bore of the bushing which is registered coaxially with and opens to the flow passage through the block 22.

A cylindrical plunger 30 rotatably and reciprocably mating with the bore of the bushing 23 extends upwardly within the block 17 to engagement with the lower end of a follower pin 31 in and reciprocable with a guide 32 shiftable axially of and projecting beyond the upper end of said block for reaction to an engine rocker arm, not shown; an expansive spring 33 between the block and the outer end of the guide yieldably urging said guide and the associated pin 31 to the limit of their projection from the body 17 as determined by a stop pin 34. A head 30' on the upper end of the plunger 30 is loosely retained in the lower end of the guide 32 and a length of the plunger 30 within the body 17 is formed to some angularity of cross section, as at 35, and slidably traverses a gear 36 thus engaged for rotation with said plunger interiorly of the body, and a rack 37 mounted for shift in and chordally of the body 17 meshes with the gear 36 for selective rotation of the latter and consequent rotation of the plunger. An annular shoulder 38 interiorly of the body 17 serves as an upward stop to displacement of the gear 36 axially of the body and a retainer sleeve 39 spacedly about the plunger between the upper end of the bushing 23 and the lower face of the gear 36 operates to limit displacement of said gear in the opposite direction, thus to maintain said gear in meshed relation with the rack 37 as the plunger is caused to reciprocate through the gear.

The plunger 30 is of a length to space its lower end well above the block 22 when elevated to engage the lower end of the pin 31 in the position of pin maximum projection from the body 17, and an annular cut-off shoulder 40 about and inwardly adjacent the plunger lower end cooperates with a spacedly-related, upper helix shoulder 41 about the plunger to define a metering recess for variable coaction with the ports 28 and 29 as the plunger is rotated and reciprocated; said recess normally registering with the port 28 when the plunger is elevated to the upper limit of its reciprocatory range. From the metering recess between the shoulders 40 and 41 a channel 42 opens through the lower end of the plunger 30 through which liquid fuel supplied under pressure to the space about the bushing 23 may pass to fill the portion of the bushing bore intercepted between the block 22 and plunger lower end as a fuel charge subject to action of the plunger and effective to elevate said plunger in maintained engagement with the follower pin 31.

Liquid fuel constantly supplied under pressure through the passage 26 circulates with cooling effect about the bushing 23 to return to the fuel supply through passages and connections not shown, thereby constantly and fully charging the ports 28 and 29, the metering recess between the shoulders 40 and 41, the channel 42, and the bushing bore portion between the block 22 and plunger lower end with fuel at the pressure under which it is supplied, which is less than the pressure required to effect injection through the tip 18 against the conditions obtaining within the engine cylinder served by the injector. When the rocker arm acts in appropriate timed relation with other elements of the engine to depress the pin 31 and guide 32 against the pressure of the spring 33, the plunger 30 is depressed to drive a fuel charge, in a quantity determined by the relation of the shoulders 40 and 41 to the ports 28 and 29 and regulated by rotation of the plunger through the agency of the gear 36 and rack 37, through the passage controlled by the valves 19 and 21 and as an atomized ejection from the tip 18 to the engine combustion chamber, thus accomplishing the functions of the injector.

The valves 19 and 21 of the conventional organization shown and just described are provided to positively inhibit intrusion of pressures from the combustion chamber to the injector interior through the passage controlled thereby and to positively close said passage to any leakage or bleeding of liquid fuel therethrough save when the plunger is actuated for timed delivery of a metered fuel charge, but experience has established that the arrangement of the spring-loaded valve in the tip and the flat valve inwardly of the injector therefrom is less than satisfactory in operation and frequently productive of engine malfunctioning. The deficiencies of the conventional valve arrangement shown in Figure 1 derive primarily from the location of the spring-loaded valve 19 in the spray tip 18 where it is subject to the high heats of combustion in the engine cylinder and remote from the cooling effects of the fuel circulating about the bushing 23 within the injector, and in the use of the flat valve 21 inwardly of the injector from the valve 19 in an arrangement which maintains said flat valve open with relation to the associated flow passage except when engine cylinder pressures become manifest past the valve 19 with force sufficient to close the flat valve. Exposure to the high heats of combustion may, and frequently does, impair positive and effective operation of the valve 19 through deterioration of normal spring pressure which permits the valve to leak at a pressure differential less than that intended, and the normal open passage condition of the flat valve imposes liquid fuel under its supply pressure directly upon the valve 19 in position to leak therethrough when the spring is weakened or when the valve is held from full closing by a solid particle wedged thereunder; the said flat valve closing the passage only in reaction to a pressure greater than that of the fuel supply acting through the weakened or open valve 19 against the lower face of the flat valve.

Correction of the deficiencies and elimination of the malfunctioning above noted is readily had through the provision of a second spring-loaded valve in substitution for the flat valve 21 in a disposition subject to the cooling effect of the liquid fuel circulation about the bushing 23, as shown in Figure 5, or through a reversal of the conventional valve arrangement which mounts the flat valve at the inner end of the spray tip in underlying relation with the spring-loaded valve which is disposed within the cooling influence of the liquid fuel circulation interiorly of the injector, as in Figure 12, and a significant feature of the invention is the method and technique whereby such corrective arrangements of the valve organization may be applied to and accomplished within the conventional injector unit at little expense and with conservation of the major elements and operative organization of the original unit.

Applying the principles of the invention for conversion of the conventional injector unit shown in Figure 1 to the improved form shown in Figure 5, the valve seat 20, flat valve 21, and block 22 of the conventional unit are discarded in favor of a substitute spring-loaded valve member structurally analogous and operatively equivalent to the valve 19 and characterized by a deep cup 20' formed with a flow passage through its closed end and adapted to seat within the nose of the housing 15 and against the inner end of the spray tip 18 for passage-closing cooperation with the valve 19 as did the valve seat 20 which it replaces, a spring-loaded check valve 21' in said cup 20' structurally and operatively duplicating the valve 19, and a block 22' formed with a central flow passage and preferably thinner than the block 22 registered with and closing over the open end of the cup 20' as a seat for the upper end of the check valve 21'. The replacement valve member characterized by the cup 20' mounts within the nose of the housing 15 exactly as did the flat valve arrangement for which it is substituted save for a greater intrusion axially and interiorly of the housing due to the greater axial length of the replacement member necessary to accommodate the spring-loaded check valve and is susceptible of operative correlation with the other elements of the conventional unit through few and simple alterations of the latter and the addition of but two other supplements. To accommodate the replacement member, the free end of the threaded tubular extension of the block 17 is shortened, as represented by broken lines in Figure 2, and the keyway utilized to lock the bushing 23 against rotation is deepened inwardly of the block, a distance equal to that by which the axial length of the replacement member exceeds the axial length of the original flat valve arrangement, thus to provide a modified block 17', the follower pin 31 is similarly shortened, as indicated by broken lines in Figure 4, through removal from its inner end of a length equal to that removed from the block 17, thus to provide a modified pin 31', and the gear retainer sleeve 39 is similarly and correspondingly shortened, as indicated by broken lines in Figure 3, to provide a modified such sleeve 39'. Completing the prerequisites for the desired conversion, a supplemental spacer sleeve 43, Figures 6 and 7, is provided in the form of a straight tube having an axial length equal to the axial dimension removed from each of the elements 17, 31 and 39, an inner diameter engageable loosely about the plunger 30 and under the head 30' thereof, and an outer diameter receivable within the guide 32 for retention at and by the guide lower end, and a second supplement is provided in the form of a ring 44, Figures 8 and 9, having an inner opening engageable embracingly about the block 22' and the adjacent upper end of the cup 21', a castellated and inwardly-chamfered lower margin 44' conformably engageable in the angle between the seated cup 21' and the adjacent inner end wall of the housing 15 nose, and an axial dimension such as to dispose its flat end coplanar with the inmost face of the block 22' when the elements are assembled as shown in Figures 5 and 12.

Modified and supplemented as shown and described, the elements of the original injector unit are assembled with the replacement valve member characterized by the cup 21' substituted for the original flat valve arrangement, with the ring 44 in place about the block 22' and the inner end of the cup 21' to retain said latter elements in appropriate correlation, and with the spacer sleeve 43 engaged between the head 30' of the plunger 30 and the lower end of the guide 32, in which relationship of elements the shortened tubular extension of the block 17' clamps the bushing 23 to and in appropriate operative relation with the block 22' in an elevation of said bushing and the plunger 30 which preserves all functional and operative correlations of the original assembly with the advantage of a normally-closed, spring-loaded, positive valve removed from adverse heat effect, subject to the cooling influence of the circulating liquid fuel, and in a tandem, supplementing association with the valve 19 of the spray tip which eliminates the shortcomings of the original organization. As should be apparent, the elevation of the bushing 23 in the conversion is exactly compensated by corresponding elevation of the plunger head in contact with the shortened follower pin 31' as supported by the sleeve 43, the gear 36 is retained in its original position through the agency of the shortened retainer 39', and the castellated lower margin of the ring 44 enhances access of the circulating liquid fuel to and for cooling effect upon the cup 21'.

Since, with the replacement valve member including the spring-loaded element 21' in place between the spray tip 18 and the bushing 23, the valve 19 has as its principal, and perhaps only, function to inhibit intrusion of pressures from the combustion chamber through the valved ejection passage, it is practical and frequently expedient to eliminate the heat-susceptible spring-loaded valve in the spray tip in favor of a flat valve, much less effected by heat, of the same type as the original valve 21 in the manner illustrated by Figure 12. Utilizing the principles and advantages of the conversion as shown and described with elimination of the spring-loaded valve 19, the spray tip 18 is discarded in favor of a substitute tip 18' formed with a straight ejection passage enlarged at the inner end of the tip to accommodate a flat valve 21 therein disposed for closing coaction with a valve seat on the adjacent surface of the cup 21' lower end in reaction to pressures obtaining within the ejection passage below said valve; substitution of the tip 18' mounting the flat valve 21 being but a variant of the conversion typified by Figure 5 and above described.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. In a Diesel fuel injector having a nosed housing, an outer check valve assembly through the nose of said housing, a bushing and plunger assembly shiftable interiorly and axially of the housing, and means for shifting and securing said bushing and plunger assembly relative to the housing, a spring-loaded valve unit supplemental to said check valve assembly operatively correlated with and between the latter and the bushing and plunger assembly, said valve unit comprising an axially-apertured cup seated on said check valve assembly with the cup open end directed toward the adjacent end of the bushing and plunger assembly, a centrally-apertured block peripherally registered with and closing over the open end of said cup for clamped engagement by the adjacent end of the bushing element of the bushing end plunger assembly, a check valve in said cup spring-biased into closing coaction with the aperture of said block, and a ring supplement about said block and the adjacent portion of the cup between the end of the bushing bearing against the block and the spacedly-adjacent inner face end of the housing nose.

2. A Diesel fuel injector conversion applicable as a supplemental valve unit to conventional injectors having a nosed housing, an outer check valve assembly through the nose of said housing, a bushing and plunger assembly shiftable interiorly and axially of the housing, and means for shifting and securing said bushing and plunger assembly relative to the housing, said conversion comprising an axially-apertured cup adapted to seat on said check valve assembly with its open end directed toward the adjacent end of the bushing element of the bushing and plunger assembly, a centrally-apertured block peripherally registrable with and to close over the open end of said cup adapted for clamped engagement by the adjacent end of the bushing, a check valve in said cup spring-biased for closing coaction with the aperture of said block, and a ring supplement engageable about said block and the adjacent portion of said cup adapted for clamped engagement in such disposition between the end of the bushing and the spacedly-adjacent inner face of the housing nose.

References Cited in the file of this patent
UNITED STATES PATENTS

| | | |
|---|---|---|
| 2,014,088 | Nicolas | Sept. 10, 1935 |
| 2,144,861 | Truxell | Jan. 24, 1939 |
| 2,571,501 | Truxell | Oct. 16, 1951 |
| 2,628,866 | Purchas | Feb. 17, 1953 |